US012617709B2

(12) United States Patent  
Gomatam

(10) Patent No.: US 12,617,709 B2  
(45) Date of Patent: May 5, 2026

(54) IN-TOWER OPTICAL FIBER BENDING

(71) Applicant: Sterlite Technologies Limited, Haryana (IN)

(72) Inventor: Badri Gomatam, Haryana (IN)

(*) Notice: Subject to any disclaimer, the term of this patent is extended or adjusted under 35 U.S.C. 154(b) by 110 days.

(21) Appl. No.: 18/176,659

(22) Filed: Mar. 1, 2023

(65) Prior Publication Data

US 2023/0339800 A1 Oct. 26, 2023

(30) Foreign Application Priority Data

Mar. 31, 2022 (IN) .............................. 202211019367

(51) Int. Cl.  
*C03B 37/029* (2006.01)  
*C03B 37/14* (2006.01)

(52) U.S. Cl.  
CPC ............ *C03B 37/14* (2013.01); *C03B 37/029* (2013.01); *C03B 2203/06* (2013.01)

(58) Field of Classification Search  
None  
See application file for complete search history.

(56) References Cited

U.S. PATENT DOCUMENTS

| | | | |
|---|---|---|---|
| 2014/0226948 A1* | 8/2014 | Enomoto | G02B 6/10 |
| | | | 65/435 |
| 2018/0246274 A1* | 8/2018 | Billings | C03B 37/029 |
| 2019/0256400 A1* | 8/2019 | Bookbinder | C03B 37/025 |

FOREIGN PATENT DOCUMENTS

WO WO-2023167304 A1 * 9/2023 ......... C03B 37/0253

OTHER PUBLICATIONS

WO-2023167304-A1 Machine translation by Clarivate Analytics Retrieved Jan. 10, 2025. (Year: 2025).*

* cited by examiner

*Primary Examiner* — Lisa L Herring  
(74) *Attorney, Agent, or Firm* — Steven R. Fairchild

(57) ABSTRACT

The invention discloses a draw tower (100) comprising a top end zone (108) to insert a preform along with fluid and the preform is melted into an optical fiber (106) that exits from a bottom end zone (110). The draw tower (100) includes a plurality of air knives (112) distorting optical fiber path such that partially uncooled optical fiber deviates from a vertical path to a bended path wherein the plurality of air knives (112) is a plurality of openings arranged such that to cause distortion on the vertical path of the optical fiber (106) in the draw tower (100) and the plurality of openings is a combination of one or more of a suction and pumping of the fluid. Further, the bended path length is greater than a vertical path length and is defined by laminar flow for at least 70% of the bended path length.

6 Claims, 4 Drawing Sheets

200

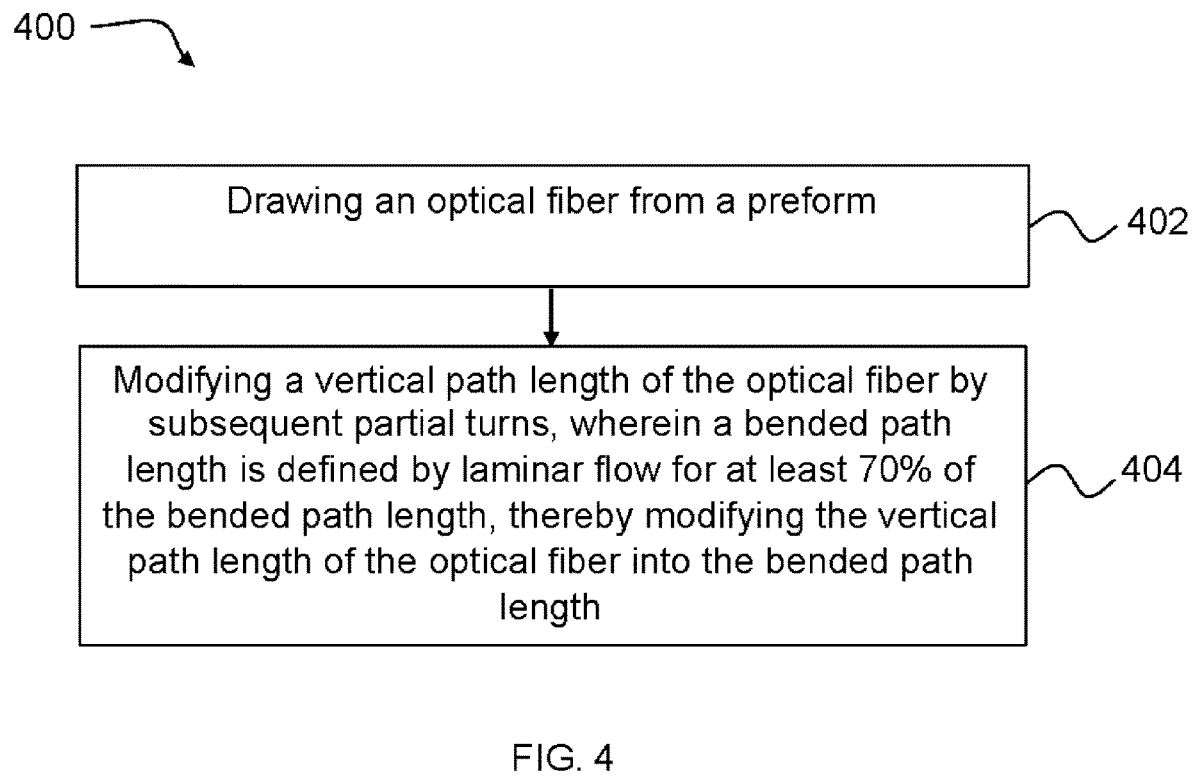

400

Drawing an optical fiber from a preform ⟿ 402

Modifying a vertical path length of the optical fiber by subsequent partial turns, wherein a bended path length is defined by laminar flow for at least 70% of the bended path length, thereby modifying the vertical path length of the optical fiber into the bended path length ⟿ 404

FIG. 4

IN-TOWER OPTICAL FIBER BENDING

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

CROSS REFERENCE TO RELATED APPLICATION

This application claims the benefit of Indian Application No. 202211019367 titled "IN-TOWER OPTICAL FIBER BENDING" filed by the applicant on Mar. 31, 2022, which is incorporated herein by reference in its entirety.

FIELD

The present invention relates to the field of optical fiber manufacturing equipment and more particularly, relates to an optical fiber draw tower facilitating in-tower optical fiber bending and an optical fiber processing method.

BACKGROUND OF THE INVENTION

With the progress of communication networks in recent years, optical fiber communication networks have been rapidly developed. Optical fibers are useful in a wide variety of applications, including the telecommunications industry for voice, video, and data transmissions. Currently, a demand for reducing the manufacturing cost of an optical fiber is ever increasing, in addition to an improvement of optical transmission characteristics of the optical fiber.

In recent years, significant advancements have been made in the manufacture of optical waveguide fiber, which in turn have increased the usable light carrying capacity of the fiber. However, it is well known that electromagnetic radiation traveling through an optical waveguide fiber is subject to attenuation or lose due to several mechanisms. Although some of these mechanisms cannot be reduced, others have been eliminated, or at least substantially reduced.

Manufacturing methods for producing optical fibers typically include drawing optical fiber from a glass perform that is heated in a draw furnace, cooling the drawn fiber, and coating the fiber after it has sufficiently cooled. However, the process parameters employed by the fiber manufacturing process may have a significant impact on the resultant performance characteristics of the drawn fiber. During optical fiber manufacturing, glass preforms are heated at a high temperature significantly above the softening point of the glass and drawn at a high draw down ratio and a high draw speed to produce an optical fiber due to which the glass preforms do not reach an equilibrium state. This results in the production of optical fiber with high fictive temperature, which is undesirable as it results in increased attenuation, i.e. signal loss.

One way to address the aforesaid drawbacks is modifying fiber processing conditions that can allow manufacturing the optical fiber with lower fictive temperature. Efforts to reduce fictive temperature have emphasized slow cooling to stabilize the optical fiber in a state closer to an equilibrium state.

Prolonged cooling of an optical fiber at temperatures in the glass transition range of the fiber is another strategy for reducing fictive temperature.

US Patent Application No. US20190256400 titled "Low attenuation optical fiber" discloses an optical fiber with low attenuation. In particular, the optical fiber is produced under conditions that reduce fictive temperature.

U.S. Pat. No. 10,696,580B2 titled "Optical fiber with low fictive temperature" discloses an optical fiber with low fictive temperature along with a system and method for making the optical fiber.

WIPO Patent Application No. WO2014046274A1 titled "Optical fiber fabrication method" discloses a method in which the fictive temperature is sufficiently reduced to fabricate an optical fiber with low loss and high yield.

U.S. Pat. No. 6,565,775B2 titled "Method of cooling an optical fiber while it is being drawn" discloses a method of cooling an optical fiber during drawing through contact with at least one cooling fluid in at least one cooling area. In particular, the temperature profile of each cooling area is established so that the fictive temperature of a cladding of the optical fiber is maximized, and the fictive temperature of a core of the optical fiber is minimized.

However, there are a number of drawbacks in the current technologies for manufacturing optical fibers with lower fictive temperature. In particular, the fictive temperature is not reduced to a satisfactory/desired level by the currently used manufacturing methods due to a short residence time. Subsequently, the structure of the glass preforms does not reach a required equilibrium state as the decrease in the fictive temperature is small. Moreover, the existing manufacturing methods utilize a turn or fold mechanism and mechanically move the path of the draw outside the draw tower assembly. As a result, the optical fiber cannot be drawn within required fictive temperature and attenuation values without dimensionally changing the existing draw tower set-up. This, in turn, makes the fiber drawing process costly due to the requirement of additional equipment.

Furthermore, conventional slow-cooling techniques do not optimize the temperature history of the optical fiber in a predetermined range. As a result, such conventional slow-cooling techniques may not efficiently reduce attenuation in the optical fiber, and may degrade productivity, because a heating furnace for slow cooling may become unnecessarily long, or a drawing speed may become slow to ensure a long slow-cooling time.

Therefore, there exists a need for an improved technique which solves the aforesaid drawbacks and allows easy manufacturing of optical fibers in restricted space (i.e., within an available volume of the draw tower) without encroaching outside space of the draw tower and with increased residence time and reduced fictive temperature and attenuation.

Accordingly, to overcome the disadvantages of the prior arts, there is a need for a technical solution that overcomes the above-stated limitations in the prior arts. The present invention provides a method for conveniently manufacturing optical fibers in restricted space or within an available volume of the draw tower, without encroaching the outside space of the draw tower and with increased residence time and reduced fictive temperature and attenuation.

SUMMARY OF THE INVENTION

Embodiments of the present invention provide an optical fiber draw tower configured to melt a preform into an optical fiber, the optical fiber draw tower including a top end zone and a bottom end zone, a preform inserted at the top end zone and is melted into the optical fiber that exits from the bottom end zone and a plurality of air knives that distorts an optical fiber path such that partially uncooled optical fiber deviates from a vertical path and follows a bended path. In particular, a fluid is inserted into the optical fiber draw tower from the top end zone.

In accordance with an embodiment of the present invention, a bended path length is greater than a vertical path length. And., the bended path length is defined by laminar flow for at least 70% of the bended path length.

In accordance with an embodiment of the present invention, the plurality of air knives is a plurality of openings arranged such that to cause distortion on the vertical path of the optical fiber in the optical fiber draw tower. In particular, the plurality of openings is a combination of one or more of a suction and pumping of the fluid. Moreover, the plurality of air knives modifies mass flow of the fluid in a predefined manner to modify the optical fiber path inside the optical fiber draw tower.

In accordance with an embodiment of the present invention, the plurality of air knives is arranged such that the fluid enters or exits the optical fiber draw tower at an angle of 0-89 degrees with respect to the vertical path.

In accordance with an embodiment of the present invention, the bended path length is at least 10% greater than the vertical path length of the optical fiber.

In accordance with an embodiment of the present invention, the bended path length for a single partial turn.

In accordance with another embodiment of the present invention, the bended path length for multiple partial turns.

In accordance with an embodiment of the present invention, the bended path length for multiple partial turns.

Another aspect of the invention relates to a method of drawing an optical fiber in an optical fiber draw tower comprising steps of drawing the optical fiber from a preform and modifying a vertical path length of the optical fiber by subsequent partial turns. Particularly, the bended path length is defined by laminar flow for at least 70% of the bended path length, thereby modifying the vertical path length of the optical fiber into the bended path length.

In accordance with an embodiment of the present invention, the method further includes modifying the vertical path length of the optical fiber by the subsequent partial turns further comprises applying external force to uncooled optical fiber at one or more predefined zones in the optical fiber draw tower; and altering path of a fluid at the one or more predefined zones in the optical fiber draw tower due to application of the external force causing the uncooled optical fiber to deviate from the vertical path into a bended path.

In accordance with an embodiment of the present invention, the method further includes applying the external force to the uncooled optical fiber comprising at least one of adding or removing fluid mass from the optical fiber draw tower in the one or more predefined zones such that the optical fiber bends subsequently in partial turns, thereby modifying the vertical path length to a bended path length.

The foregoing objectives of the present invention are attained by employing an optical fiber draw tower facilitating in-tower optical fiber bending and a processing and drawing method thereof.

BRIEF DESCRIPTION OF THE DRAWINGS

So that the manner in which the above recited features of the present invention is understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

The invention herein will be better understood from the following description with reference to the drawings, in which:

FIG. 4 is a flowchart illustrating drawing the optical fiber in accordance with an embodiment of the present invention.

Figure 1:
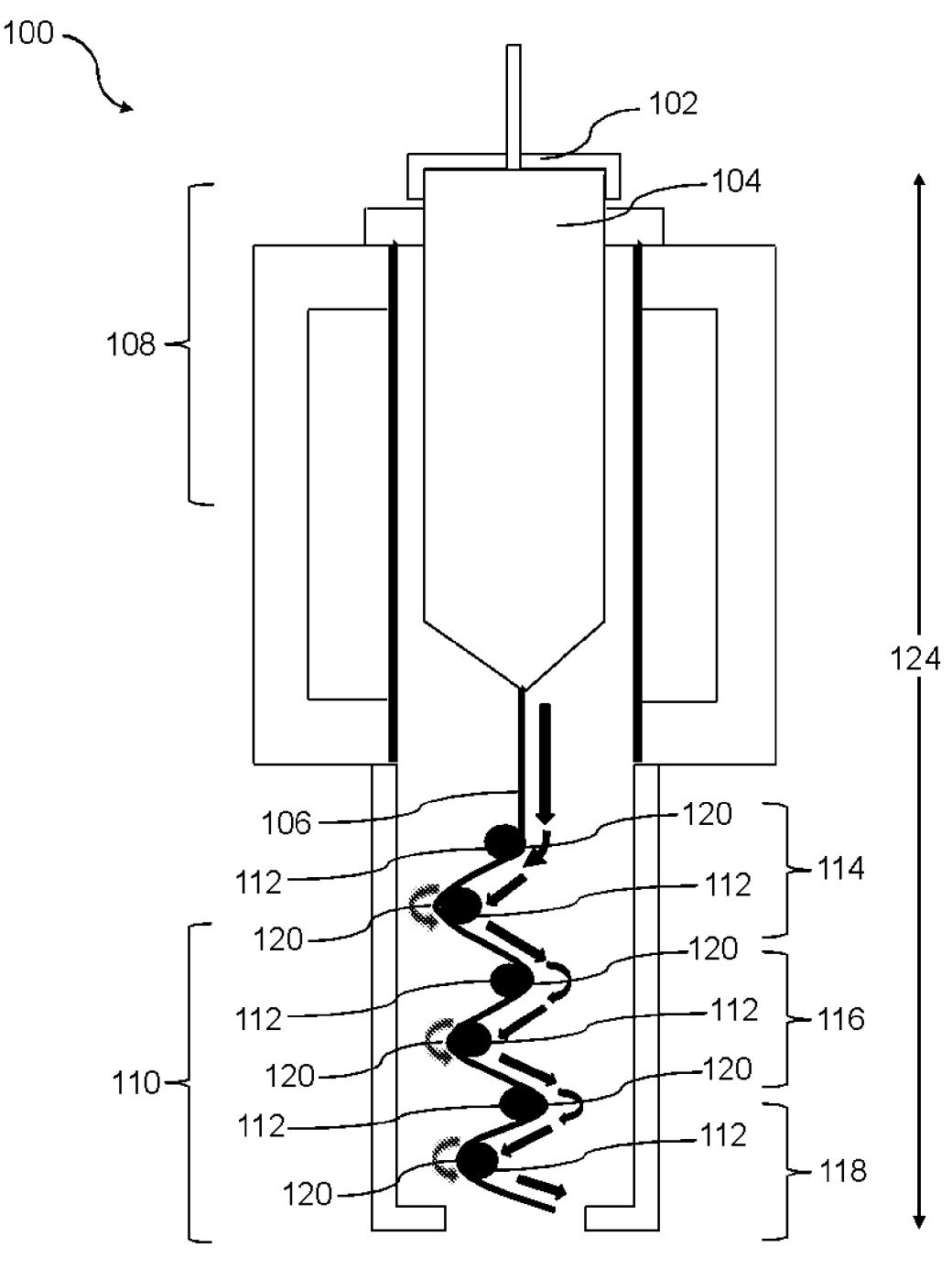
FIG. 1 is a snapshot illustrating an optical fiber draw tower in accordance with an embodiment of the present invention.

It should be noted that the accompanying figure is intended to present illustrations of exemplary embodiments of the present invention. This figure is not intended to limit the scope of the present invention. It should also be noted that the accompanying figure is not necessarily drawn to scale.

DETAILED DESCRIPTION OF THE PREFERRED EMBODIMENTS

The principles of the present invention and their advantages are best understood by referring to FIG. 1 to FIG. 4. In the following detailed description numerous specific details are set forth in order to provide a thorough understanding of the embodiment of invention as illustrative or exemplary embodiments of the invention, specific embodiments in which the invention may be practiced are described in sufficient detail to enable those skilled in the art to practice the disclosed embodiments. However, it will be obvious to a person skilled in the art that the embodiments of the invention may be practiced with or without these specific details. In other instances, well known methods, procedures and components have not been described in detail so as not to unnecessarily obscure aspects of the embodiments of the invention.

The following detailed description is, therefore, not to be taken in a limiting sense, and the scope of the present invention is defined by the appended claims and equivalents thereof. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. References within the specification to "one embodiment," "an embodiment," "embodiments," or "one or more embodiments" are intended to indicate that a particular feature, structure, or characteristic described in connection with the embodiment is included in at least one embodiment of the present invention.

Although the terms first, second, etc. may be used herein to describe various elements, these elements should not be limited by these terms. These terms are generally only used to distinguish one element from another and do not denote any order, ranking, quantity, or importance, but rather are used to distinguish one element from another. Further, the terms "a" and "an" herein do not denote a limitation of quantity, but rather denote the presence of at least one of the referenced items.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The following brief definition of terms shall apply throughout the present disclosure:

The ITU.T, stands for International Telecommunication Union-Telecommunication Standardization Sector, is one of the three sectors of the ITU. The ITU is the United Nations specialized agency in the field of telecommunications and is responsible for studying technical, operating and tariff questions and issuing recommendations on them with a view to standardizing telecommunications on a worldwide basis. The optical fiber may be a bend insensitive fiber that has less degradation in optical properties or less increment in optical attenuation during multiple winding/unwinding operations of an optical fiber cable.

Figure 2:
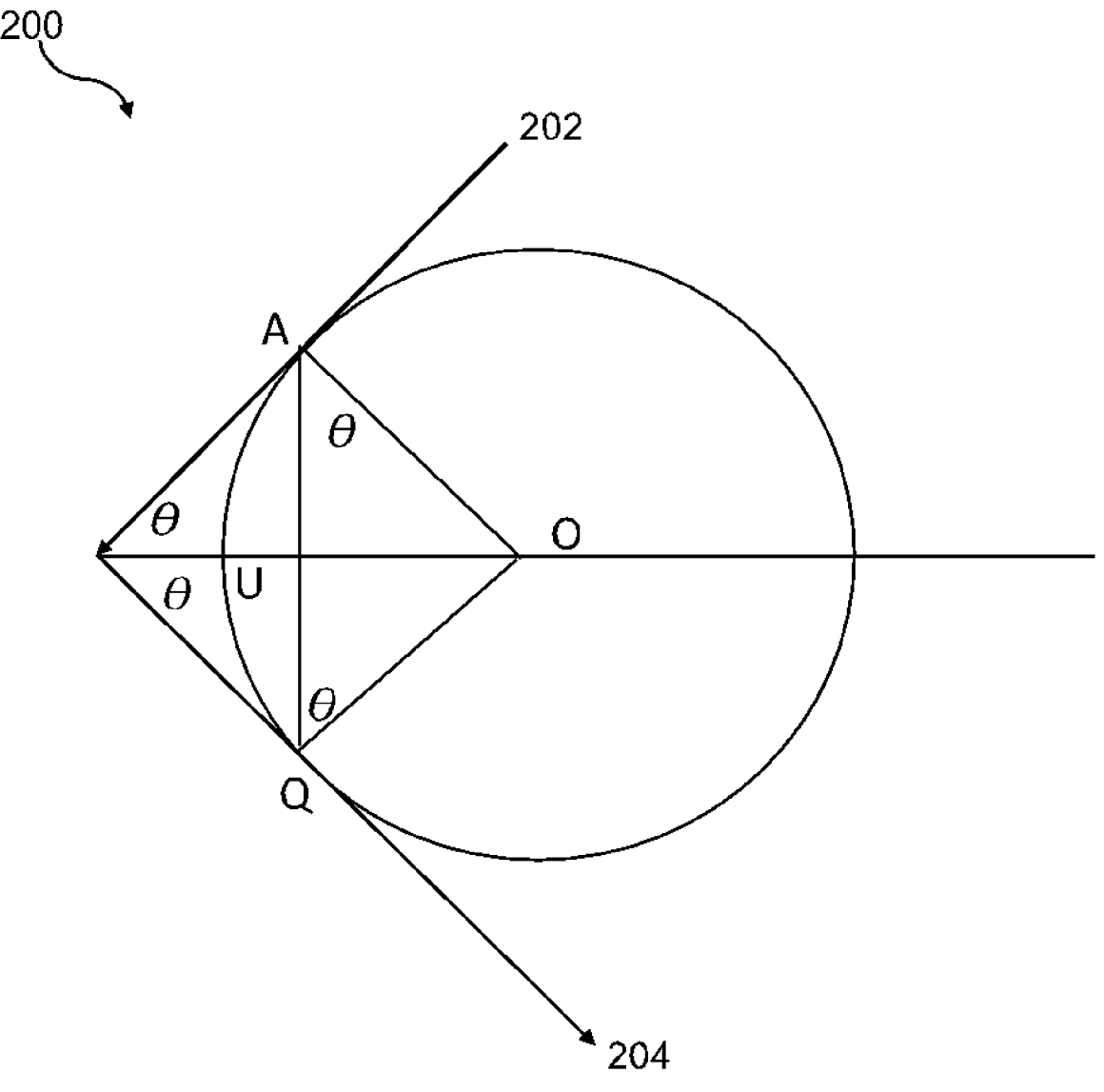
FIG. 2 is a snapshot illustrating an exemplary illustration showing a single partial turn for an optical fiber in accordance with an embodiment of the present invention.
Figure 3:
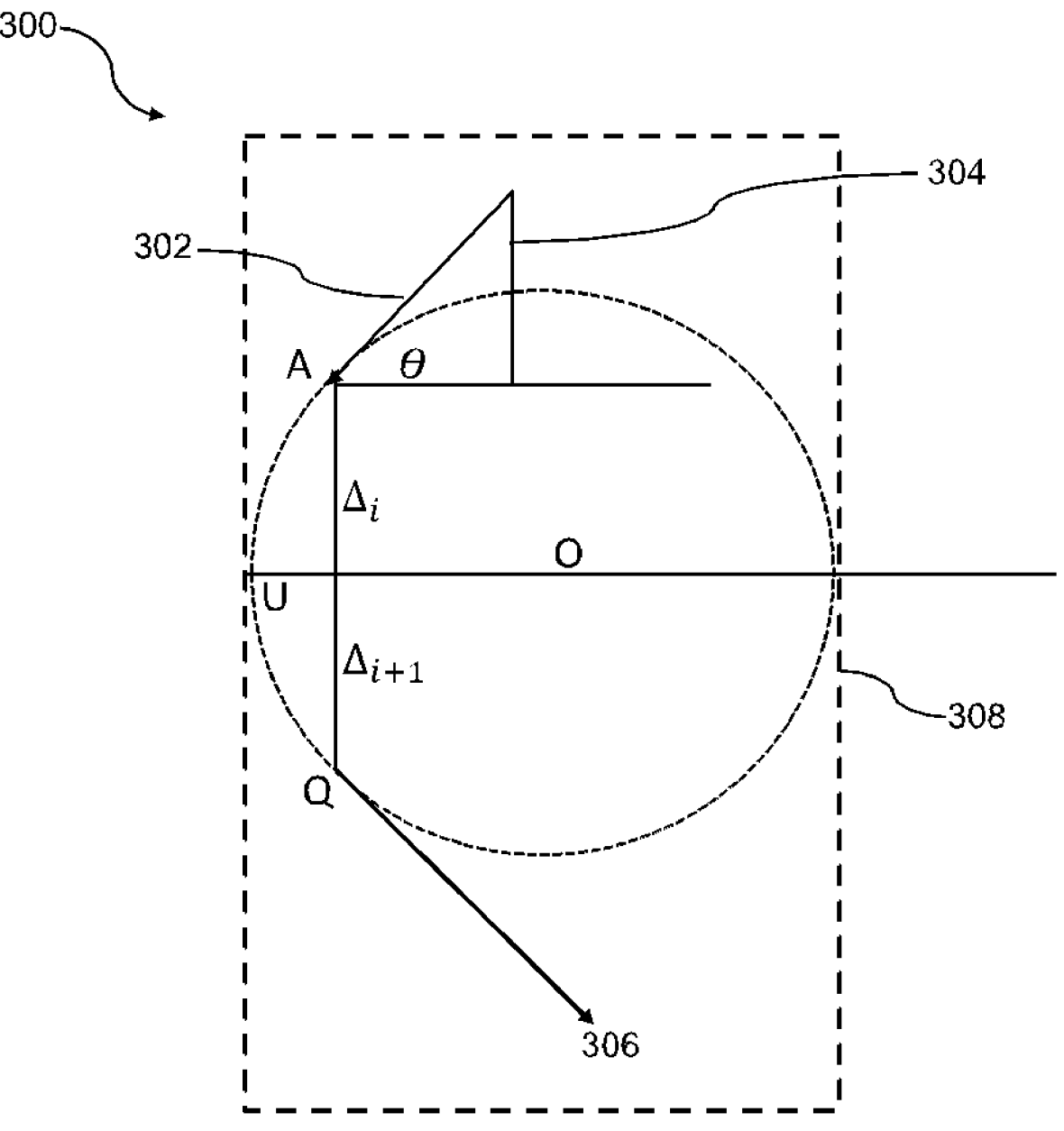
FIG. 3 is a snapshot illustrating exemplary illustration of multiple partial turns for the optical fiber in accordance with an embodiment of the present invention.

In opening, simultaneous reference is made to FIG. 1 through FIG. 3, in whichFIG. 1 is a snapshot illustrating an optical fiber draw tower, FIG. 2 is a snapshot illustrating an exemplary illustration showing a single partial turn for an optical fiber, FIG. 3 is a snapshot illustrating exemplary illustration of multiple partial turns for the optical fiber in accordance with various embodiments of the present invention.

The optical fiber draw tower 100 may also be referred to as a draw tower. In particular, the optical fiber draw tower 100 is configured to melt a preform 104 into an optical fiber 106 and is defined by a top end zone 108 and a bottom end zone 110. The preform 104 is inserted at the top end zone 108 and is melted into the optical fiber 106 that exits from the bottom end zone 110. Moreover, the temperature at the top end zone 108 is in the range 950 to 1050 degree Celsius and the temperature at the bottom end zone 110 is in the range 750 degree Celsius to 800 degree Celsius.

In accordance with an embodiment of the present invention, the preform 104 is a glass preform i.e., silica preform.

The optical fiber 106 refers to a medium associated with transmission of information over long distances in the form of light pulses. The optical fiber uses light to transmit voice and data communications over long distances when encapsulated in a jacket/sheath. The optical fiber may be of ITU.T G.657.A2 category. Alternatively, the optical fiber may be of ITU.T G.657.A1 or G.657.B3 or G.652.D or a multi-core or other suitable category.

The fluid inserted into the optical fiber draw tower 100 from the top end zone 108 may be liquid or air or N2 (nitrogen) or other suitable fluid.

In accordance with an embodiment of the present invention, the optical fiber draw tower 100 comprises, but not limited to, a preform insertion device 102 and a plurality of air knives 112. The preform insertion device 102 may also be referred to as a preform holding device. Particularly, preform insertion device 102 is configured to hold and insert the preform 104 inside the optical fiber draw tower 100 and is installed near the top end zone 108 of the optical fiber draw tower 100.

The plurality of air knives 112 is a plurality of air bearings arranged along with height 124 of the optical fiber draw tower 100. In particular, the plurality of air knives 112 is configured to distort an optical fiber path such that partially uncooled optical fiber deviates from a vertical path and follows a bended path as shown in FIG. 1, where the vertical path is defined by gravitational force and a bended path length is greater than a vertical path length.

In an exemplary example, the bended path length is at least 10% greater than the vertical path length of the optical fiber 106, leading to at least 10% increase in residence time of the optical fiber 106.

Typically, residence time is the total time that the optical fiber 106 has spent inside the optical fiber draw tower 100. Further, the bended path length is defined by laminar flow for at least 70% of the bended path length.

In accordance with an embodiment of the present invention, the plurality of air knives 112 is configured to guide semi-cooled fiber in a non-linear path in a vertical resultant fiber draw direction. The plurality of air knives 112 includes a plurality of openings arranged such that to cause distortion on the vertical path of the optical fiber in the optical fiber draw tower (100). Moreover, the plurality of openings is a combination of one or more of a suction and pumping of the fluid. Further, the plurality of openings of either pump-in and suck-out fluid causes distortion in fluid flow path, while maintaining the laminar flow, which causes increase in path length without increasing space requirements.

In accordance with an embodiment of the present invention, the plurality of air knives 112 are arranged such that the fluid enters or exits the optical fiber draw tower 100 at an angle of 0-89 degrees with respect to the vertical path.

Particularly, the plurality of air knives 112 modifies mass flow of the fluid in a predefined manner to modify the optical fiber path inside the optical fiber draw tower 100 and exerts a force to displace the optical fiber 106 of mass less than 37 km for 1 kg glass, where the optical fiber 106 may have a diameter of 250 microns or less. Further, the plurality of air knives 112 modifies the vertical path length taken by the optical fiber 106 (in melted state) due to gravity by subsequent partial turns as depicted in FIG. 1.

Such modification in the vertical path length is done by applying external force to the optical fiber (uncooled optical fiber) at one or more predefined zones 114, 116, 118 in the optical fiber draw tower 100 and by altering path of the fluid at the one or more predefined zones 114, 116, 118 in the optical fiber draw tower 100 due to application of the external force which causes the optical fiber in uncooled state to deviate from the vertical path into the bended path. The external force to the optical fiber in uncooled state is applied by at least one of adding or removing fluid mass from the optical fiber draw tower 100 in the one or more predefined zones 114, 116, 118 such that the optical fiber bends subsequently in the partial turns.

In accordance with an embodiment of the present invention, the plurality of air knives 112 guides the slanted path along with gravity. In particular, the optical fiber 106 drawn from the preform 104 is conveyed through the plurality of air knives 112, where a first air knife from the plurality of air knives 112 directs the optical fiber 106 to a second air knife, the second air knife directs the optical fiber 106 to a third air knife and so on so forth. In other words, the optical fiber 106 is directed from a first set of air knives of the plurality of air knives 112 to a second set of air knives of the plurality of air knives 112 that facilitate controlled cooling of the optical fiber 106. The optical fiber 106 is directed from the first set of air knives to the second set of air knives in an alternate manner and at predefined angles such that a bending angle of the first set of air knives is different than a bending angle of the second set of air knives that results in multiple partial turns 120 to the optical fiber 106.

In accordance with an embodiment of the present invention, the multiple partial turns 120 are step turns in a sequence, which may be implemented between 10-90 degrees in the optical fiber draw tower 100. Advantageously, sum of partial turns increases the residence time of the optical fiber 106. The multiple partial turns 120 can be achieved by optimizing fluid flow with the optical fiber draw tower 100, where the fluid flow in the optical fiber draw tower 100 is directed from top to bottom. One example of optimization technique includes use of multiple inlets and outlets (i.e., the plurality of openings) along the height 124 of the optical fiber draw tower 100 for the fluid flow. Other optimization techniques may also be used.

Due to the aforementioned arrangement, the length of the optical fiber 106 exiting a turn is +1 the length of optical fiber 106 entering the turn. For the same referring to FIG. 2 and FIG. 3 depicting the single partial turn and multiple partial turns 120 respectively, which is further explained below using equations:

Equation 1—Bended path length for the single partial turn:

$$OA=OU=OQ=r$$

$$AQ=2\Delta=2r\cos\cos\theta \tag{1}$$

Where A=entrance path of the optical fiber shown using reference numeral 202 and Q=exit path of the optical fiber shown using reference numeral 204.

Equation 2-Bended path length for the multiple partial turns 120 within an idealized tower frame border, i.e., available tower width 308:

$$\sum_{i=1}^{N} h_i + \sum_{i=1}^{N} \Delta_i = H_T$$

$$\sum_{i=1}^{N} L_i = H_T(1 + p) \tag{2}$$

Where p=desired fractional increase in draw path length, N=number of turn segments required to cover a vertical drop 304 and $H_T$=available tower height. Further, $L_i$ is length of the optical fiber entering the $i^{th}$ turn as depicted using reference numeral 302, $L_{i+1}$ is length of the optical fiber exiting the $i^{th}$ turn as depicted using reference numeral 306 and hi is corresponding vertical drop of path entering the $i^{th}$ turn as depicted using reference numeral 304.

Equation 3-Bended path length for the multiple partial turns 120 within the idealized tower frame border, i.e., available tower width 308:

$$\cos\cos\theta = \frac{2H_T}{NW_T}[1 - (1 + p)\sin\sin\theta] \tag{3}$$

Where p=desired fractional increase in draw path length, N=number of turn segments required to cover the vertical drop 304, $H_T$=available tower height and $W_T$=available tower width.

The above equations show the constraint if the optical fiber production is restricted to a horizontal dimension of $W_T$ given a vertical drop of hi and a desired fractional increase of p in the path length.

After exiting the plurality of air knives 112, the optical fiber 106 may be directed for further controlled cooling or directed to other processing units for such as but not limited to coating, spooling.

In accordance with an embodiment of the present invention, the plurality of air knives 112 with bending angle less than 90 degrees can be accommodated in existing draw tower constraint that allows sequential turning of the optical fiber 106 at predefined angles i.e., less than 90 degrees in a predefined draw tower volume which further increases the residence time and annealing/dwell time within a standard draw tower height and width as shown using the above equations. Resultantly, one can achieve the optical fiber 106 within required fictive temperature and attenuation values (for example, 0.17 dB/km-0.18 dB/km) without dimensionally changing the existing draw tower set-up. In general, the fictive temperature is the temperature at which corresponding liquid structure and properties of glass are frozen in upon cooling and the attenuation corresponds to signal loss.

FIG. 4 is a flow chart representing a method of drawing the optical fiber 106 in the optical fiber draw tower 100 in accordance with an embodiment of the present invention.

At step 402, the method includes drawing the optical fiber 106 from the preform 104.

At step 404, the method includes modifying the vertical path length of the optical fiber 106 by subsequent partial turns, wherein the bended path length is defined by laminar flow for at least 70% of the bended path length, thereby modifying the vertical path length of the optical fiber 106 into the bended path length. In this step, the plurality of air knives 112 modifies the vertical path length taken by the optical fiber 106 (in melted state) due to gravity by subsequent partial turns. In particular, such modification in the vertical path length is done by applying external force to the optical fiber (uncooled optical fiber) at the one or more predefined zones 114, 116, 118 in the optical fiber draw tower 100 and by altering path of the fluid at the one or more predefined zones 114, 116, 118 in the optical fiber draw tower 100 due to application of the external force which causes the optical fiber in uncooled state to deviate from the vertical path into the bended path. The external force to the optical fiber in uncooled state is applied by at least one of adding or removing the fluid mass from the optical fiber draw tower 100 in the one or more predefined zones 114, 116, 118 such that the optical fiber bends subsequently in the partial turns.

It may be noted that the flow chart 400 is explained to have above stated process steps; however, those skilled in the art would appreciate that the flow chart 400 may have more/less number of process steps which may enable all the above stated implementations of the present disclosure.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

It will be apparent to those skilled in the art that other embodiments of the invention will be apparent to those skilled in the art from consideration of the specification and practice of the invention. While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope of the invention. It is intended that the specification and examples be considered as exemplary, with the true scope of the invention being indicated by the claims.

I claim:

1. An optical fiber draw tower (100) configured to melt a preform (104) into an optical fiber (106), the optical fiber draw tower (100) comprising:

a top end zone (108) and a bottom end zone (110), wherein the preform (104) is inserted at the top end zone (108) and is melted into the optical fiber (106) that exits from the bottom end zone (110), wherein a fluid is inserted into the optical fiber draw tower (100) from the top end zone (108); and a plurality of air knives (112) that distorts an optical fiber path such that partially uncooled optical fiber deviates from a vertical path and follows a bended path, wherein the vertical path is defined by an axis parallel to the optical fiber draw tower (100), wherein the plurality of air knives (112) is a plurality of openings arranged to cause distortion on the vertical path of the optical fiber (106) in the optical fiber draw tower (100), wherein the plurality of openings is a combination of one or more of a suction and pumping of the fluid, wherein a length of the bended path is greater than a length of the vertical path, wherein the length of the bended path is defined by laminar flow for at least 70% of the length of the bended path.

2. The optical fiber draw tower (100) as claimed in claim 1, wherein the plurality of air knives (112) modifies mass flow of the fluid in a predefined manner to distort the optical fiber path inside the optical fiber draw tower (100).

3. The optical fiber draw tower (100) as claimed in claim 1, wherein the plurality of air knives (112) is arranged such that the fluid enters or exits the optical fiber draw tower (100) at an angle of 0-89 degrees with respect to the vertical path.

4. The optical fiber draw tower (100) as claimed in claim 1, wherein the bended path length is at least 10% greater than the vertical path length of the optical fiber (106).

5. The optical fiber draw tower (100) as claimed in claim 1, wherein the plurality of air knives (112) comprises a first set of air knives and a second set of air knives, and wherein the optical fiber (106) is directed from the first set of air knives to the second set of air knives in an alternate manner and at predefined angles such that a bending angle of the first set of air knives is different than a bending angle of the second set of air knives that results in multiple partial turns (120) to the optical fiber (106).

6. The optical fiber draw tower (100) as claimed in claim 5, wherein distorting the vertical path of the optical fiber (106) by the multiple partial turns comprises:

applying external force to uncooled optical fiber (106) at one or more predefined zones (114, 116, 118) in the optical fiber draw tower (100); and altering a path of a fluid at the one or more predefined zones (114, 116, 118) in the optical fiber draw tower (100) due to application of the external force causing the uncooled optical fiber (106) to deviate from the vertical path into a bended path.

* * * * *